(12) United States Patent
Sandri et al.

(10) Patent No.: US 6,240,134 B1
(45) Date of Patent: May 29, 2001

(54) METHOD FOR STABILIZING THE OPERATION OF FRACTIONALLY SPACED SEQUALIZER IN DIGITAL SIGNAL RECEIVERS

(75) Inventors: Andrea Sandri, Monza (IT); Carlo Luschi, Oxford (GB); Arnaldo Spalvieri, Milan (IT)

(73) Assignee: Alcatel, Paris (FR)

( * ) Notice: Subject to any disclaimer, the term of this patent is extended or adjusted under 35 U.S.C. 154(b) by 0 days.

(21) Appl. No.: 09/132,444

(22) Filed: Aug. 11, 1998

(30) Foreign Application Priority Data

Sep. 30, 1997 (IT) .................................... TO97A0862

(51) Int. Cl.$^7$ ...................................................... H03H 7/30
(52) U.S. Cl. .............................................................. 375/234
(58) Field of Search ...................................... 375/229, 232, 375/234; 708/323

(56) References Cited

U.S. PATENT DOCUMENTS 5,095,495 * 3/1992 Golden ................................ 375/234

OTHER PUBLICATIONS

"Stablizing the Fractionally Spaced Equalizer by Prewhitening", A. Spalvieri et al, *IEEE Global Telecommunications Conference* (Globecom) US, New York, IEEE 1995, pp. 93–97.

"Stablizing the Fractionally Spaced Equalizer by Prewhitening", A. Spalvieri et al, *Globecom '95*, IEEE 1995 Global Telecommunications Conf., Nov. 13–17, 1995, Singapore, pp. 1–5.

"The Tap–Leakage Algorithm: An Algorithm for the Stable Operation of a Digitally Implemented, Fractionally Spaced Adaptive Equalizer", R. Gitlin et al, *The Bell System Technical Journal*, vol. 61, No. 8, Oct. 1982, pp. 1817–1839.

"A New Tap–Adjustment Algorithm for the Fractionally Spaced Equalizer" by T. Uyematsu et al, Globecom '85, pp. 1420–1423 Dec. 1985.

"Stabilizing Fractionally Spaced Equalizers" by G. Karam et al Globecom '91, IEEE Global Telecommunication Conference 1991 pp. 1807–1811.

* cited by examiner

Primary Examiner—Amanda T. Le

(57) ABSTRACT

A method and/or system for the stable operation of fractionally spaced equalizers available in digital signal receivers, having a plurality of equalization coefficients, said equalization coefficients being updatableby minimizing a proper cost function and stabilizable through a proper change of said cost function, said change of said cost function requiring the use of a virtual noise matrix. According to the invention, the cost function (J) for the updating of the coefficients of the fractionally spaced equalizer (FSE) is changed by adding a cyclostationary virtual interference [v(t)].

14 Claims, 3 Drawing Sheets

METHOD FOR STABILIZING THE OPERATION OF FRACTIONALLY SPACED SEQUALIZER IN DIGITAL SIGNAL RECEIVERS

BACKGROUND OF THE INVENTION

1. Technical Field

This invention concerns a method for stabilizing the operation of fractionally spaced equalizers used in digital signal receivers, having a plurality of equalization coefficients, said equalization coefficients being updatable through minimization of a proper cost function and stabilizable through a proper change of said cost function, said cost function entailing the use of a virtual noise matrix. The invention concerns also the relating fractionally spaced equalizer and the digital signal receiver incorporated in it.

2. Discussion of Related Art

Adaptive equalization is a technique commonly used to compensate the channel distorting effect in a general transmission system. According to a known technique synchronous equalizers obtained through FIR (Finite Impulse Response) filters are used with variable coefficients time-spaced by an amount equal to the signal interval or to the symbol time.

Improved performance may be obtained using the so called fractionally spaced equalizers (FSE) consisting of an adaptive FIR filter with coefficients time-spaced by an amount equal to a fraction of the signal interval or to the symbol time. Performances of the fractionally spaced equalizer with a sufficient number of coefficients are practically independent from the phase characteristics of the transmission channel and from the phase of the symbol synchronism as reconstructed during reception. More generally, a fractionally spaced equalizer is able to execute, in an adaptive manner, and only in one device, both the adaptive filtering and equalization functions, for instance, to emulate the optimum linear receiver.

However, the fractionally spaced equalizer has two main drawbacks: first of all, the coefficient drift phenomenon and, secondly, its low convergence rate. Both said drawbacks are due to the fact that a fractionally spaced equalizer generally has more configurations than the coefficients, which substantially correspond to the same root-mean-square error or, more generally speaking, to the same value of the cost function of the equalized signal. In other words, the cost does not significantly change according to certain directions around the point corresponding to the optimum configuration point of the coefficients.

It has been proved through experimental tests that a fractionally spaced equalizer is affected by a long term instability due to the unavoidable bias occurring in the control circuits. This behaviour leads the equalizer to operate with coefficients whose values are so high to cause 'overflow' phenomena in the registers or coefficient saturation, with a consequent performance deterioration. Therefore, in order to maximize the performance of a fractionally spaced equalizer it is necessary to apply proper control algorithm stabilization techniques capable of avoiding the coefficient drift and increasing the convergence rate. To this end it has been proposed, for instance in the article by R. D. Gitlin, H. C. Meadors, S. B. Weinstein, '*The Tap-Leakage Algorithm: An Algorithm for the Stable Operation of a Digitally Implemented Fractionally Spaced Equalizer*', Bell Sys. Tech. J., vol. 61, no. 8, pp. 1817–1839, October 1982, to change the control algorithm of the fractionally spaced equalizer by introducing a predetermined amount of white noise. Said technique, called 'tap-leakage', is an efficient measure against coefficient drift while improving convergence rate. Nevertheless, the performances of the fractionally spaced equalizer are worsened, since the fictitious noise outside the signal band contributes to stabilization, whereas the fictitious noise inside the band jeopardizes the achievement of an optimum coefficient configuration. Therefore, in the article '*A new Tap-Adjustment Algorithm for the Fractionally Spaced Equalizer*', by T. Uyematsu e K. Sakaniwa, GLOBECOM '85, pp. 1420–1423, December 1985, suggests to introduce a fictitious noise with a non white spectral power density, i.e. not constant with the frequency change, and more specifically, a substantially non zero spectral power density only where the spectral power density of the signal is zero. This technique is mainly limited in that it does not allow a complete stabilization of the adaptive equalizer, as in the 'roll-off' area of the signal, i.e. the transition area from the maximum spectral power density to zero, there are still a large number of coefficient configurations associated with the same value of the root-mean-square error.

A possible remedy to the drawbacks of the previous techniques is also suggested by G. Karam, P. Moreau, H. Sari, '*Stabilizing Fractionallyly Spaced Equalizers*', GLOBECOM '91, *IEEE Global Telecommunication Conference* 1991, pp. 1807–1811, where a constraint is added to the technique proposed by Uyematsu and Sakaniwa on the transfer function form realized by the adaptive equalizer under steady state conditions. This approach requires for the equalizer itself to calculate its output signal at a frequency at least equal to $(1+\alpha)/T$, where T is the symbol time and $\alpha$ the amplitude of the roll-off area. Such a calculation increases in fact the implementative complexity of the equalizer, since calculation of the signal on the equalizer output at frequency $1/T$ is usually enough.

Another possible remedy to the drawbacks of Gitlin, Meadors, Weinstein and Uyematsu and Sakaniwa's methods is the use of a whitening filter upstream of the equalizer and the addition of white noise (for a description of such a technique see A. Spalvieri, C. Luschi, R. Sala, F. Guglielmi, '*Stabilizing the Fractionally Spaced Equalizer by Prewhitening*', GLOBECOM '95, *IEEE Global Telecommunication Conference*, Singapore, Nov. 1995, pp. 93–97). However, this technique disadvantageously requires addition of a whitening filter and a higher precision in the equalizer algebras.

SUMMARY OF INVENTION

The present invention overcomes the drawbacks mentioned above and provides a method for the stable operation of fractionally spaced equalizers, whose realization is improved and more efficient as compared with the known solutions. In this frame, it is the main object of the present invention to provide a method for the stable operation of fractionally spaced equalizers using a stable fractionally spaced adaptive equalizer and also capable of good performance.

A further object of this invention is to provide a method for the stable operation of fractionally spaced equalizers, which does not require any further filters on its reception to execute equalization.

In order to achieve these objects the present invention provides a method for the stable operation of fractionally spaced equalizers, as well as a fractionally spaced equalizer and a digital signal receiver incorporating the characteristics of the annexed claims, which form integral part of this description.

BRIEF DESCRIPTION OF THE DRAWINGS

Further objects, characteristics and advantages of the present invention will be apparent from the following detailed description and annexed drawings, which are only supplied by way of not limiting example, wherein.

DETAILED DESCRIPTION OF PREFERRED EMBODIMENTS

Figure 1:
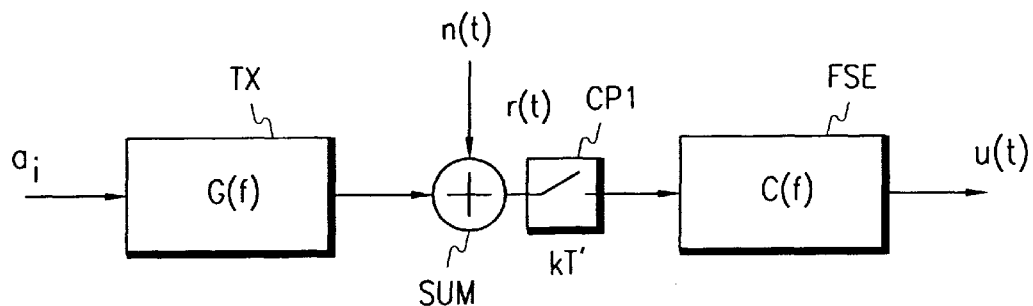
FIG. 1 shows schematically a model of a transmission method according to the known art.

In FIG. 1 there is shown a schematic diagram of a model of the transmission method according to the known art.

Therein, we find an input signal consisting of symbols $a_i$ associated with a symbol time T, and which are then transmitted with frequency 1/T to a transmission system TX, associated with which is a transfer function G(f). An adder SUM represents the symbol for the physical event of the transmission with consequent introduction of an additional channel noise n(t) to obtain a received signal r(t) at the input of a fractionally spaced equalizer FSE. The received signal r(t), before coming into said fractionally spaced equalizer FSE, is sampled by a sampler CP1 with period T', said time period T' corresponding also to the fractional time spacing of the fractionally spaced equalizer FSE. Associated with said fractionally spaced equalizer FSE is a transfer function C(f). An output signal u(t) is available at the output of the fractionally spaced equalizer FSE.

Figure 2:
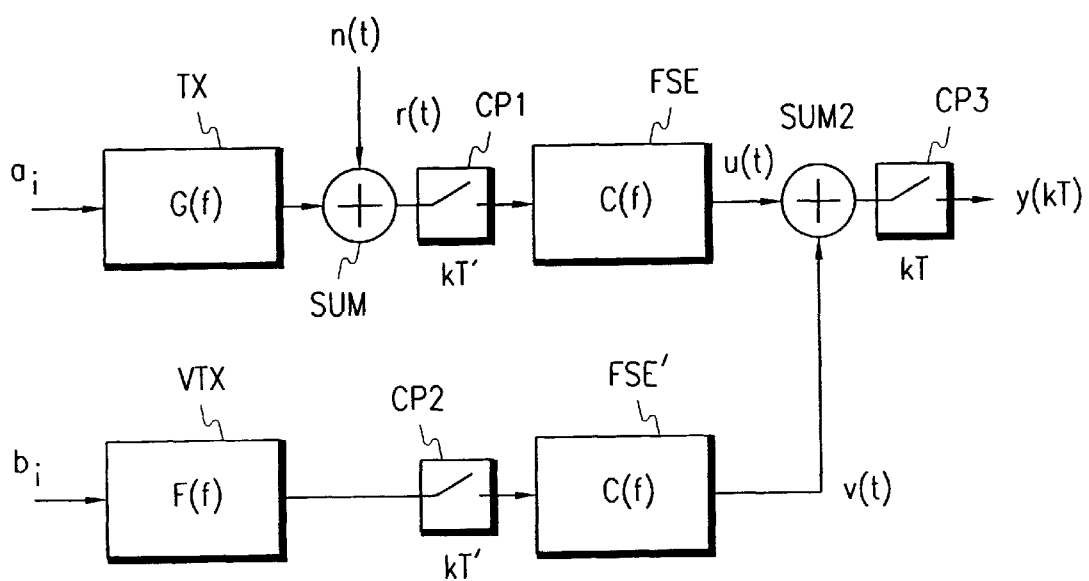
FIG. 2 shows a schematic diagram of the method and/or system for the stable operation of fractionally spaced equalizers according to the present invention.

FIG. 2 shows a schematic diagram of a model of the transmission method, as well as of the transmission system, according to the invention. In said model of method and transmission system a virtual transmission system VTX is reported in addition to the transmission system TX of FIG. 1, associated with which is a transfer function F(f). Said transmission system VTX is added to take the effects of the fictitious interferences into account. As a matter of fact, the symbols of a virtual interfering signal $b_i$, also with frequency 1/T, enter the virtual transmission system VTX. A sampler CP2, also working with a sampling period T', and a block FSE' with transfer function C(f), represent the fractionally spaced equalizer FSE also on said virtual branch of the model and determine a virtual interfering signal v(t). A summing block SUM2 will sum up the output signal u(t) and the virtual interfering signal v(t), determining the output signal y(kT) through a sampler CP3 with a sampling period T.

To understand the operation of the method and system according to the invention it should first be noted that, unlike the known art, it will be shown that the virtual interfering signal v(t) does not introduce a stationary interference but rather a non stationary interference, i.e. a cyclostationary interference with a period T. A cyclostationary interference with a period T is defined by an interference whose spectral power density may be different at the instants (kT+T/i), i being an integer ranging from 1 to N.

Therefore, the mathematical analysis of the model implementing the transmission method according to the invention is now described.

The cost function of J minimized by the fractionally spaced equalizer FSE is defined as:

$$J=E\{|y(kT)-a_k|^2\} \quad (1)$$

where the symbol E{.} indicates the mean value operation.

The purpose is to define a function F(f) allowing stabilization of the fractionally spaced equalizer FSE, without displacing the equilibrium point of the equalizer itself with reference to the event where F(f)=0 occurs, i.e. an event without introduction of a virtual interfering signal $b_i$ of any kind. Upon reaching such a condition, a stable fractionally spaced equalizer FSE is obtained free from performance degradation.

Optimum transfer function $C_{ott}(f)$ of the fractionally spaced equalizer FSE in the absence of the virtual interfering signal v(t) appears similar (see e.g. the article by S. U. H. Qureshi mentioned above) to:

$$C_{ott}(f)=\sigma_a G^*(f)/[N(f)+(\sigma_a^2/T)\Sigma|G(f+n/T)|^2] \quad (2)$$

where N(f) is the spectral power density of the channel additional noise.

We notice that when the transfer function F(f) is such to comply with the condition $$\Sigma_n F(f+n/T)C_{ott}(f+n/T)=0, \quad (2a)$$

the virtual interfering signal v(t) at the output of the fractionally spaced equalizer FSE' is zero at the sampling instants t=kT. Thus, the cost function J given by (1) is not altered by the introduction of the virtual interfering signal v(t) and, as a result, the same performance as it would be obtained in the absence of a virtual interference is reached.

The choice of transfer function F(f):

$$F(f)=\pm[C_{ott}(f-1/T)-C_{ott}(f+1/T)] \quad (3)$$

allows for instance the condition (2a) to be satisfied and the achievement of a stabilization of the equalizer better than or equal to the one obtainable through known techniques.

Figure 3:
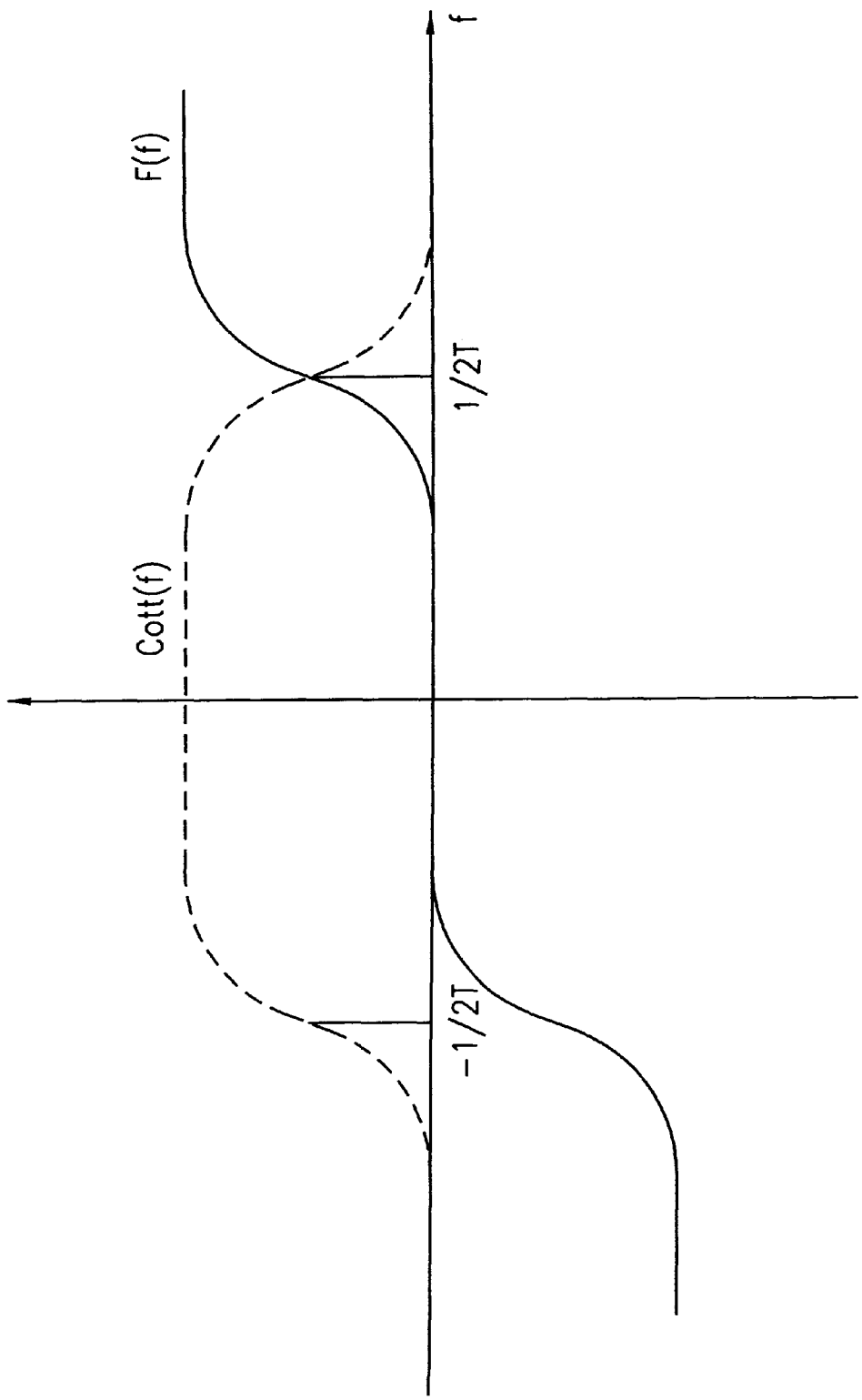
FIG. 3 shows a plot of particular function curves used in the method for the stable operation of fractionally spaced equalizers according to the invention.

It can be clearly seen that equations (2) and (3) imply a dependence of F(f) from the transfer function G(f) and from the spectrum of the channel additional noise N(f), which are generally unknown. A reasonable choice, even if non limiting, is to set the transfer function F(f) using in (3) the $C_{ott}(f)$ obtainable in the absence of distortions caused by propagation (G(f) constant) and in the presence of white noise (N(f) constant). It is verified by calculation that, under typical propagation and noise conditions of the radio channel, such a choice causes an irrelevant performance degradation as compared with the ideal case represented in (3). FIG. 3 represents the curve of the transfer function F(f) according to equation (3) in the typical instance of the transmission filter having a behaviour of the 'Nyquist root' type.

By summarizing, a virtual transmission system VTX with associated transfer function F(f) has been provided. Consequently, a condition (3) has been sought for which the virtual interfering signal v(t), determined by such a transfer function F(f) at the output of the equalizer FSE at the sampling instants kT, is zero so that the equilibrium point of the fractionally spaced equalizer FSE, and consequently its performance, remain unchanged with respect to optimum values.

Due to the independence between symbols $a_k$ and symbols $b_k$, definition (1) of the cost function J can then be re-written as:

$$J = E\{|u(kT) - a_k|^2\} + c^\dagger Q c, \quad (4)$$

where:

$E\{|u(kT) - a_k|^2\}$ can be considered as a mean square deviation on the signal in the absence of interfering signal;

matrix Q is the virtual interference matrix whose element (i,j) element, by requiring condition (2a) be satisfied, is:

$$q_{j,i} = \Sigma_n f(nT - iT/2) f^*(nT - jT/2) \quad (4a)$$

f(t) is the inverse Fourier transform of the transfer function F(f), symbol \ denotes complex conjugate transpose, symbol * denotes complex conjugate relation, c is the column vector of the coefficients of the fractionally spaced equalizer FSE, whose discrete Fourier transform is the transfer function C(f).

Let's say that the first term of the new cost function (4) is the root-mean-square error actually available at the receiver output shown in FIG. 1 and determined by the output signal u(t), whereas the second term is the root-mean-square error due to the cyclostationary virtual interference v(t).

A possible algorithm to minimize the cost function (4) is the known stocastic gradient algorithm leading to the following updating rule of the equalization coefficients c:

$$c_i^{(k+1)} = c_i^{(k)} - \gamma(\epsilon^{(k)} r^*_{k-i} + \Sigma_j q_{i,j} c_j^{(k)}) \quad (5)$$

where $\gamma$ is the step-size, $\epsilon^{(k)}$ the error of the decisor corresponding to the derivative of $e_k$, $r^*_{k-i}$ the signal received at the previous instant. The product $\epsilon^{(k)} r^*_{k-i}$ is called MMSE update.

Equations (4) and (5) give a practical implementation, i.e. a virtual interferring matrix Q expressing the shape of the virtual interference v(t). By imposing the above condition (2a) we obtain the form (4a) expressing a virtual interference matrix Q related to a virtual cyclostationary interference v(t), i.e. statistical characteristics that may differ in the instants (kT+T/i), where T is the symbol time and i is an integer ranging from 1 to N.

Figure 4:
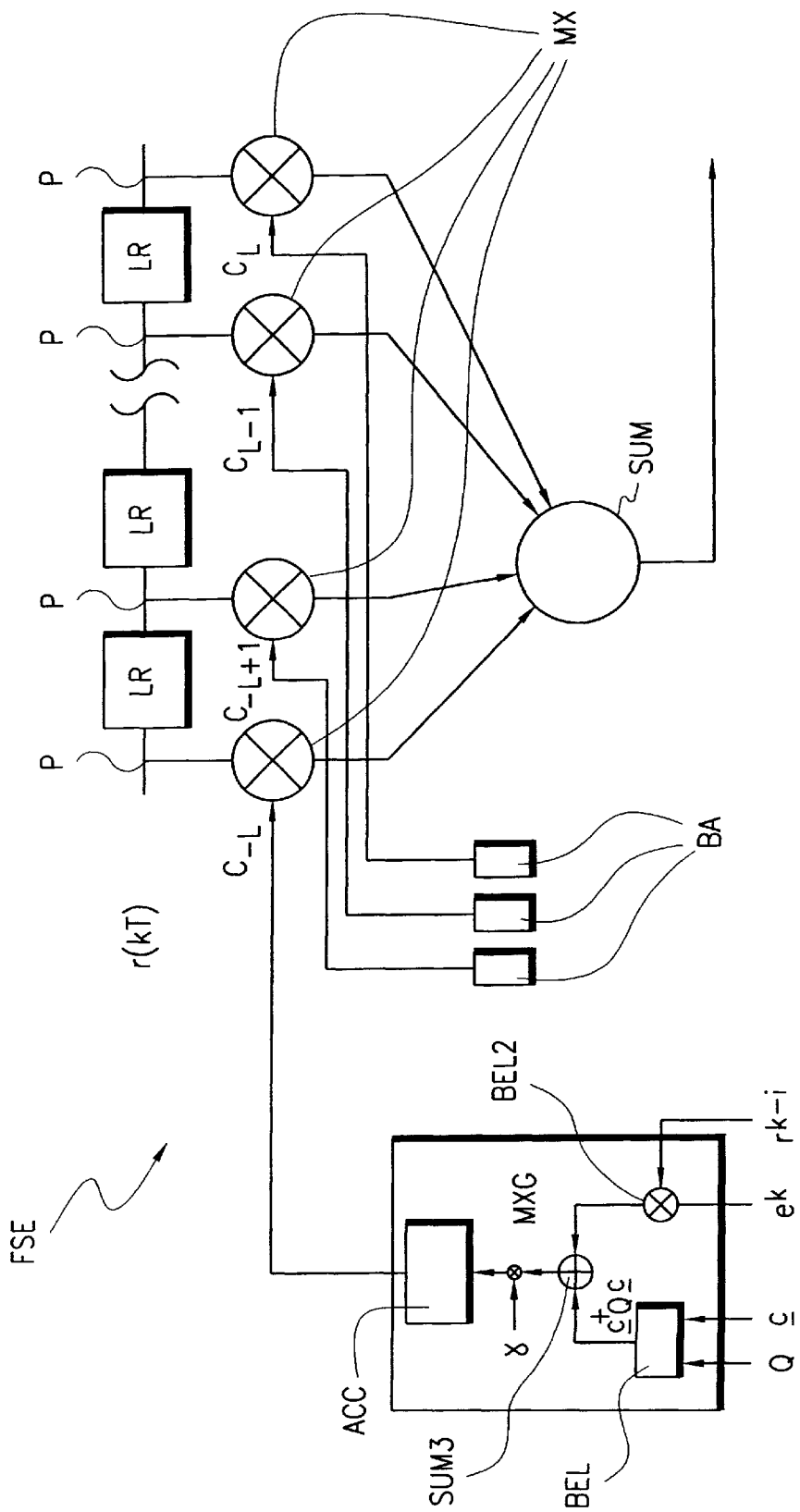
FIG. 4 shows a schematic diagram of a stabilizing system of a fractionally spaced equalizer according to the invention.

FIG. 4 represents a system for a possible method implementation according to this invention. FIG. 4 shows a fractionally spaced equalizer FSE fitted with delay lines LR introducing delay time T', which is smaller than symbol time T. Therefore, picked up from the taps P of the fractionally spaced equalizer FSE are time spaced signals with delay T', which will reach multiplier blocks MX to be multiplied by the respective equalization coefficients forming the vector c. An adder SUM rebuilds the equalized signal y (kT). It should be noted that the diagram of FIG. 2 and the diagram of FIG. 4 contain two different models of the same method for the stable operation of the fractionally spaced equalizer FSE.

Updating blocks BA provide each i-th equalization coefficient $c_i^{(k+1)}$. The number of updating blocks BA in the fractionally spaced equalizer FSE is equal to the number of equalization coefficients $c_i^{(k+1)}$, i.e. equal to the number of its taps P. The updating block BA receives at its input the elements of the matrix Q, the equalization coefficients c, the error $\epsilon^{(k)}$ at the decisor, the received signal $r^*_{k-i}$. The error $\epsilon^{(k)}$ at the decisor is calculated, by a block not shown here, substantially according to equation (4). The matrix Q and equalization coefficients c are elaborated by a processor block BEL, which executes the operation $c^\dagger Q c$ according to equation (4), or more exactly summation $\Sigma_j q_{i,j} c_j^{(k)}$ according to equation (5). This implies, for instance, that the processor block BEL is in a position to select proper elements $q_{i,j}$ of the matrix Q for the calculation of the relevant i-th equalization coefficient $c_i^{(k+1)}$. A second processor block BEL2 receives at its input the error at the decisor $\epsilon^{(k)}$, and $r_{k-i}$ the signal received at the previous instant. Outputs of processor blocks BEL and BEL2 are summed through an adder SUM3, a multiplier MXG multiplying by step-size $\gamma$ and an accumulator circuit ACC, thus changing the previous value to determine equalization coefficients $c_i^{(k+1)}$ at the instant k+1. Said equalization coefficients $c_i^{(k+1)}$ at the instant k+1 are then sent to the multiplier MX.

Therefore, equalization coefficients $c_i^{(k+1)}$ are calculated at the instant k+1 through block BA, so that the virtual interference introduced in the updating rule according to (5) is cyclostationary, i.e. its spectral power density can be different in the instants (kT+T/i), i being an integer ranging from 1 to N.

The characteristics of the present invention as well as its advantages are apparent from the above description.

The method and/or system for the stable operation of fractionally spaced equalizers according to the invention allows a favorable stabilization of the fractionally spaced equalizer free from performance degradation. As a matter of fact, through a proper design of the virtual interference matrix, such that the virtual interference is of the cyclostationary type, it is obtained that, when sampling the signal downstream of the equalizer at the instants kT, the spectral power density of said noise is negligible or zero in the portion of the range of interest. This means that the equilibrium point of the fractionally spaced equalizer is not displaced and performance is not subject to degradation. Nevertheless, since the virtual interference is introduced anyway in the coefficient update algorithm, the fractionally spaced equalizer is stabilized.

It is clear that many changes of the method and/or system for the stable operation of fractionally spaced equalizer described by way of example, are apparent to a person skilled in the art, without departing from the principles of the innovative idea, as it is also clear that in putting it into practice the shape and size of the details described above may be different, and the same replaced by others which are technically equivalent.

Specifically the forms of the virtual interference matrix may be different in dependance upon the various choices of the virtual transfer function F(f), which have to comply anyway with the nullity condition downstream of the equalizer at the sampling instants. Likewise, the choices of the optimum transfer function $C_{ott^*}$ of the equalizer may be different in the absence of interfering signal. Moreover, the use of various mathematical algorithms for error evaluation will be possible, including the method of the minimum mean-square error (MMSE) or Godard's algorithm or still the family of constant module algorithms (CMA), as well as the use of adaptive algorithms of the equalization coefficients differing from the stocastic gradient method, but requiring error evaluation and error correction.

Although the invention has been shown and described with respect to a best mode embodiment thereof, it should be understood by those skilled in the art that the foregoing and various other changes, omissions and additions in the form and detail thereof may be made therein without departing from the spirit and scope of the invention.

What is claimed is:

1. A method for stabilizing the operation of fractionally spaced equalizers used in digital signal receivers, the digital signal receivers comprising taps (P) and having a plurality of equalizing coefficients that can be updated by minimizing a proper cost junction (J) and that can be stabilized by changing the cost function (J), the changing of the cost function requiring the use of a virtual interference matrix (Q), the method comprising the step of, in changing the cost function, adding a cyclostationary virtual interference (v(t)) to time-spaced signals picked up from the taps (P).

2. A method as in claim 1, further comprising the steps of:
   a) feeding each of the time-spaced signals to a corresponding multiplier block (MX);
   b) multiplying the time-spaced signals by respective equalization coefficients, thereby providing multiplied time-spaced signals; and
   c) summing the multiplied time-spaced signals, thereby providing an equalized signal (y(kT)).

3. A method as in claim 1, wherein the cyclostationary virtual interference (v(t)) is such that when sampling it, with period equal to the symbol time (T), downstream of the fractionally spaced equalizer (FSE), the cyclostationary virtual interference (v(t)) is negligible or zero when the fractionally spaced equalizer (FSE) is in a steady state condition.

4. A method as in claim 3, characterized in that the cyclostationary virtual interference (v(t)) has statistical characteristics that may differ at the instants kT+T/i, where T is the symbol time and i an integer ranging from 1 to some predetermined integer N.

5. A method as in claim 4, wherein a fictitious interference matrix (Q) shaping the spectral power density of the cyclostationary virtual interference (v(t)) is used in changing the cost function (J).

6. A method as in claim 5, wherein the fictitious interference matrix (Q) is calculated using a virtual transfer function (F(f)), said virtual transfer function (F(f)) being determined by imposing the condition (2a) that the virtual interference be zero or negligible when the fractionally spaced equalizer (FSE) is in a steady state condition.

7. A method as in claim 6, further comprising the step of supplying the fictitious interference matrix (Q) and the vector (c) of the equalization coefficients to a coefficient updating block (BA) that executes the following operation:

$$c_i^{(k+1)} = c_i^{(k)} - \gamma(\epsilon^k r^*_{k-i} + \Sigma_j q_{i,j} c_j^k)$$

where $\gamma$ is a so-called step-size parameter; $\epsilon^{(k)}$ is a decisor error; and $r^*_{k-i}$ is the signal received at the previous instant.

8. A method as in claim 1, further comprising the step of evaluating the cost function (J) using the method of the minimum root-mean-square error.

9. A method as in claim 1, further comprising the step of evaluating the cost function (J) using the so-called Godard's algorithm.

10. A method as in claim 1, further comprising the step of evaluating the cost function (J) using an algorithm pertaining to the family of constant module algorithms.

11. A digital signal receiver including means for executing the operations of the method of claim 1.

12. A fractionally spaced equalizer, as used in digital signal receivers, comprising:
   a) a plurality of taps;
   b) a plurality of equalization coefficients, each equalization coefficient being associated with a different, corresponding tap;
   c) means for updating the equalization coefficients based on minimizing a proper cost junction (J);
   d) means for stabilizing the equalization coefficients based on changing the cost function (J); and
   e) means for introducing a cyclostationary virtual interference (v(t)) in the changing of the cost function (J) by adding the cyclostationary virtual interference (v(t)) to time-spaced signals picked up from the taps (P).

13. A fractionally spaced equalizer as in claim 12, further comprising:
   f) multiplier blocks (MX) for receiving the time-spaced signals and multiplying the time-spaced signals by respective equalization coefficients, thereby obtaining multiplied time-spaced signals; and
   g) an adder (SUM) for summing the multiplied time-spaced signals and obtaining an equalized signal (y(kT)).

14. A digital signal receiver including a fractionally spaced equalizer as in claim 12.

* * * * *

UNITED STATES PATENT AND TRADEMARK OFFICE
CERTIFICATE OF CORRECTION

PATENT NO.    : 6,240,134 B1
DATED         : May 29, 2001
INVENTOR(S)   : Andrea Sandri et al.

It is certified that error appears in the above-identified patent and that said Letters Patent is hereby corrected as shown below:

Title page,
Item [54], Title, line 3, delete "SEQUALIZER" and substitute -- EQUALIZERS -- therefor.

Column 7,
Line 45, delete "( c )" and susbstitute -- ( $\underline{c}$ ) -- therefor.

Signed and Sealed this

Ninth Day of April, 2002

Attest:

Attesting Officer

JAMES E. ROGAN
Director of the United States Patent and Trademark Office